(12) United States Patent
Tan et al.

(10) Patent No.: US 11,367,311 B2
(45) Date of Patent: Jun. 21, 2022

(54) FACE RECOGNITION METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Lianzhi Tan, Shenzhen (CN); Shichao Liu, Shenzhen (CN); Zhaoyong Zhang, Shenzhen (CN); Yiwei Pan, Shenzhen (CN); Wu Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/900,461

(22) Filed: Jun. 12, 2020

(65) Prior Publication Data

US 2020/0311390 A1 Oct. 1, 2020

Related U.S. Application Data

(63) Continuation of application No. PCT/CN2019/075538, filed on Feb. 20, 2019.

(30) Foreign Application Priority Data

Mar. 27, 2018 (CN) .......................... 201810258504.1

(51) Int. Cl.
*G06T 7/00* (2017.01)
*G06V 40/16* (2022.01)

(52) U.S. Cl.
CPC .......... *G06V 40/172* (2022.01); *G06T 7/0004* (2013.01); *G06T 2207/20081* (2013.01); *G06T 2207/30201* (2013.01)

(58) Field of Classification Search
CPC .............. G06K 9/627; G06K 9/00288; G06K 9/00677; G06K 9/00268; G06T 7/0004;
(Continued)

(56) References Cited

U.S. PATENT DOCUMENTS

| 7,903,883 B2 | 3/2011 | Zitnick, III et al. |
| 2010/0329568 A1* | 12/2010 | Gamliel ............ G06K 9/00281 382/190 |

(Continued)

FOREIGN PATENT DOCUMENTS

| CN | 102945117 A | 2/2013 |
| CN | 105426857 A | 3/2016 |

(Continued)

OTHER PUBLICATIONS

International Search Report dated Mar. 27, 2019 in International Search Report No. PCT/CN2019/075538, with English Translation, 10 pages.

*Primary Examiner* — Syed Haider
(74) *Attorney, Agent, or Firm* — Arentfox Schiff LLP

(57) ABSTRACT

A face recognition method includes generating a target face recognition model, performing face detection on an image to obtain a first face image, and performing face recognition on the first face image in the image by using the target face recognition model to obtain a first face feature. Generating the target face recognition model includes determining a training sample, the training sample comprising a training face image calibrated with identity information, and training a general face recognition model by using the training sample, and updating a parameter of the general face recognition model based on a training target to obtain the target face recognition model, the training target being a prediction result of the general face recognition model predicting identity information of a new training face image in the (Continued)

training sample to be the calibrated identity information of the training face image in the training sample.

18 Claims, 7 Drawing Sheets

(58) Field of Classification Search
CPC ........... G06T 2207/20081; G06T 2207/30201; G06V 40/172; G06V 20/30; G06V 40/168
See application file for complete search history.

(56) References Cited

U.S. PATENT DOCUMENTS

| | | | | |
|---|---|---|---|---|
| 2013/0004029 | A1* | 1/2013 | Yamada | H04N 5/23219 382/118 |
| 2017/0300744 | A1* | 10/2017 | Ju | G06V 40/168 |
| 2020/0104568 | A1* | 4/2020 | Liang | G06K 9/00248 |

FOREIGN PATENT DOCUMENTS

| CN | 105631403 A | 6/2016 |
|---|---|---|
| CN | 106407369 A | 2/2017 |

\* cited by examiner

FACE RECOGNITION METHOD AND APPARATUS, SERVER, AND STORAGE MEDIUM

RELATED APPLICATION

This application is a continuation of International Application No. PCT/CN2019/075538, filed on Feb. 20, 2019, which claims priority to Chinese Patent Application No. 201810258504.1, filed on Mar. 27, 2018, and entitled "FACE RECOGNITION METHOD AND APPARATUS, SERVER, AND STORAGE MEDIUM." The entire disclosures of the prior applications are hereby incorporated by reference in their entirety.

FIELD OF THE TECHNOLOGY

The disclosure relates to the field of face recognition technologies.

BACKGROUND OF THE DISCLOSURE

In recent years, the wide application of image management technologies (such as electronic albums) has greatly facilitated user's management of images. At present, in an application process of an image management technology, image management is generally implemented based on a face feature of a face image recognized by a general face recognition model.

However, because the general face recognition model is obtained through training according to a public face data set, in the application process of the image management technology, there usually exists a problem of an inaccurate image management result caused by low discrimination of the face feature of the face image recognized by the general face recognition model. For example, in the application process of the image management technology, a similarity between face features of one person wearing glasses and another person wearing the same glasses recognized by the general face recognition model is very high, and even exceeds a similarity between recognized face features of the person themselves wearing the glasses and not wearing the glasses.

Therefore, a face recognition method and apparatus, a server, and a storage medium are provided, to improve the discrimination of the face feature of the recognized face image in the application process of the image management technology, thereby facilitating accurate management of the image, which is an urgent problem to be resolved.

SUMMARY

In view of this, this application provides a face recognition method, which is implemented by recognizing a face image by using a target face recognition model obtained by using a training sample formed by a face image calibrated with identity information, to improve discrimination of the face feature of the recognized face image, thereby facilitating accurate management of the image. The disclosure further provides a corresponding apparatus, device, non-transitory computer-readable storage medium, and computer program product.

In an embodiment, a face recognition method includes generating, by processing circuitry of a server, a target face recognition model. The generating the target face recognition model includes determining a training sample, the training sample including a training face image calibrated with identity information. The generating the target face recognition model also includes training a general face recognition model by using the training sample, and updating a parameter of the general face recognition model based on a training target to obtain the target face recognition model, the training target being a prediction result of the general face recognition model predicting identity information of a new training face image in the training sample to be the calibrated identity information of the training face image in the training sample. The method also includes performing, by the processing circuitry of the server, face detection on an image to obtain a first face image. The method further includes performing, by the processing circuitry of the server, face recognition on the first face image in the image by using the target face recognition model to obtain a first face feature.

In an embodiment, the training the general face recognition model by using the training sample, and updating the parameter of the general face recognition model based on the training target to obtain the target face recognition model includes performing face recognition on the new training face image by using the general face recognition model to obtain a face feature of the new training face image. The training the general face recognition model also includes calculating a mapping distance between the obtained face feature of the new training face image and a target face feature corresponding to the calibrated identity information of the training face image in the training sample. Finally, the training the general face recognition model includes updating the parameter of the general face recognition model by minimizing the mapping distance, to obtain the target face recognition model.

In an embodiment, the determining the training sample includes determining one or more training face images calibrated with the identity information, and calculating, based on each training face image of the one or more training face images calibrated with a same identity information, a target face feature corresponding to the same identity information. Finally, the determining the training sample includes obtaining, from an image storage space, an additional face image whose face feature matches the target face feature, calibrating the obtained additional face image with the same identity information corresponding to the target face feature, and using the additional face image calibrated with the same identity information as one of the one or more training face images.

In an embodiment, the method further includes predicting identity information of a face in the first face image according to the first face feature of the first face image in the image by using the target face recognition model.

In an embodiment, the identity information is associated with attribute information, the attribute information being used for confirming the performed face recognition.

In an embodiment, the method further includes determining a target friend user from friend users of a user in response to a target face recognition model sharing request, and sharing the target face recognition model to the target friend user.

In an embodiment, the determining the target friend user from the friend users of the user in response to the target face recognition model sharing request includes determining the friend users of the user in response to the target face recognition model sharing request. The determining the target friend user also includes determining to-be-selected friend users from the friend users, identity information of the to-be-selected friend users being used as the calibrated identity information of the training face image in the training sample, or identity information of friend users of the to-be-selected friend users being used as the calibrated identity information of the training face image in the training sample. Finally, the determining the target friend user includes determining one of the to-be-selected friend users as the target friend user.

In an embodiment, the method further includes generating a request result of an image clustering request based on the first face feature obtained by using the target face recognition model, the image clustering request being used for instructing to cluster images within a specified image range.

In an embodiment, the method further includes generating a request result of an image search request based on the first face feature obtained by using the target face recognition model, the image search request being used for instructing to search for an image related to specified identity information within a specified image range.

In an embodiment, the method further includes determining identity information of the obtained first face feature based on calibrated identity information corresponding to a target face feature matching the obtained first face feature.

In an embodiment, a face recognition apparatus includes processing circuitry configured to generate a target face recognition model. The processing circuitry is configured to generate the target face recognition model by determining a training sample, the training sample including a training face image calibrated with identity information. Finally, the processing circuitry is configured to generate the target face recognition model by training a general face recognition model by using the training sample, and updating a parameter of the general face recognition model based on a training target to obtain the target face recognition model, the training target being a prediction result of the general face recognition model predicting identity information of a new training face image in the training sample to be the calibrated identity information of the training face image in the training sample. The processing circuitry is further configured to perform face detection on an image to obtain a first face image. The processing circuitry is also configured to perform face recognition on the first face image in the image by using the target face recognition model to obtain a first face feature.

In an embodiment, the processing circuitry is configured to train the general face recognition model by performing face recognition on the new training face image by using the general face recognition model to obtain a face feature of the new training face image. The processing circuitry is configured to train the general face recognition model by calculating a mapping distance between the obtained face feature of the new training face image and a target face feature corresponding to the calibrated identity information of the training face image in the sample. Finally, the processing circuitry is configured to train the general face recognition model by updating the parameter of the general face recognition model by minimizing the mapping distance, to obtain the target face recognition model.

In an embodiment, the processing circuitry is configured to determine the training sample by determining one or more training face images calibrated with the identity information, and calculating, based on each training face image calibrated with a same identity information, a target face feature corresponding to the same identity information. Finally, the processing circuitry is configured to determine the training sample by obtaining, from an image storage space, an additional face image whose face feature matches the target face feature, calibrating the obtained additional face image with the same identity information corresponding to the target face feature, and using the additional face image calibrated with the same identity information as a training face image.

In an embodiment, the processing circuitry is further configured to predict identity information of a face in the first face image according to the first face feature of the first face image in the image by the target face recognition model.

In an embodiment, the identity information is associated with attribute information, the attribute information being used for confirming the performed face recognition.

In an embodiment, the processing circuitry is further configured to determine a target friend user from friend users of a user in response to a target face recognition model sharing request, and share the target face recognition model to the target friend user.

In an embodiment, the processing circuitry is configured to determine the target friend user from the friend users of the user in response to the target face recognition model sharing request by determining the friend users of the user in response to the target face recognition model sharing request. The processing circuitry is configured to determine the target friend user by determining to-be-selected friend users from the friend users, identity information of the to-be-selected friend users being used as the calibrated identity information of the training face image in the training sample, or identity information of friend users of the to-be-selected friend users being used as the calibrated identity information of the training face image in the training sample. Finally, the processing circuitry is configured to determine the target friend user by determining one of the to-be-selected friend users as the target friend user.

In an embodiment, the processing circuitry is further configured to generate a request result of an image clustering request based on the first face feature obtained by using the target face recognition model, the image clustering request being used for instructing to cluster images within a specified image range.

In an embodiment, the processing circuitry is further configured to generate a request result of an image search request based on the first face feature obtained by using the target face recognition model, the image search request being used for instructing to search for an image related to specified identity information within a specified image range.

In an embodiment, a non-transitory computer-readable storage medium is provided, the storage medium storing computer-readable instructions thereon, which, when executed by a processor, cause the processor to perform a method including generating a target face recognition model. The generating the target face recognition model including determining a training sample, the training sample including a training face image calibrated with identity information. The generating the target face recognition model also including training a general face recognition model by using the training sample, and updating a parameter of the general face recognition model based on a training target to obtain the target face recognition model, the training target being a prediction result of the general face recognition model predicting identity information of a new training face image in the training sample to be the calibrated identity information of the training face image in the training sample. The method further including performing face detection on an image to obtain a first face image, and performing face recognition on the first face image in the image by using the target face recognition model to obtain a first face feature. The disclosure provides a face recognition method, which is implemented by recognizing a face image by using a target face recognition model. The target face recognition model is generated by training a general face recognition model using a face image calibrated with identity information as a training sample and using a prediction result of the general face recognition model on identity information of a face image in the training sample being the same as the calibrated identity information of the face image in the training sample as a training target. After face detection is performed on the image to obtain the face image, the face image is inputted into the target face recognition model, so that the face feature having relatively high discrimination can be outputted, thereby improving precision of image management.

BRIEF DESCRIPTION OF THE DRAWINGS

To describe the technical solutions in the embodiments of the disclosure more clearly, the following briefly describes the accompanying drawings used for describing the embodiments. The accompanying drawings in the following description show merely some embodiments of the disclosure.

FIG. 9(*b*) is a diagram of still another image management application scenario according to an embodiment of the disclosure.

FIG. 9(*c*) is a diagram of still another image management application scenario according to an embodiment of the disclosure.

FIG. 9(*d*) is a diagram of still another image management application scenario according to an embodiment of the disclosure.

DESCRIPTION OF EMBODIMENTS

The following describes the technical solutions in the embodiments of the disclosure with reference to the accompanying drawings in the embodiments of the disclosure. The described embodiments are some of the embodiments of the disclosure rather than all of the embodiments. Based on the embodiments of the disclosure, other embodiments fall within the protection scope of the disclosure as well.

EMBODIMENTS

The embodiments of the disclosure provide a face recognition method, which may be applied to a server (for example, a face recognition server or another specially disposed server).

Figure 1:
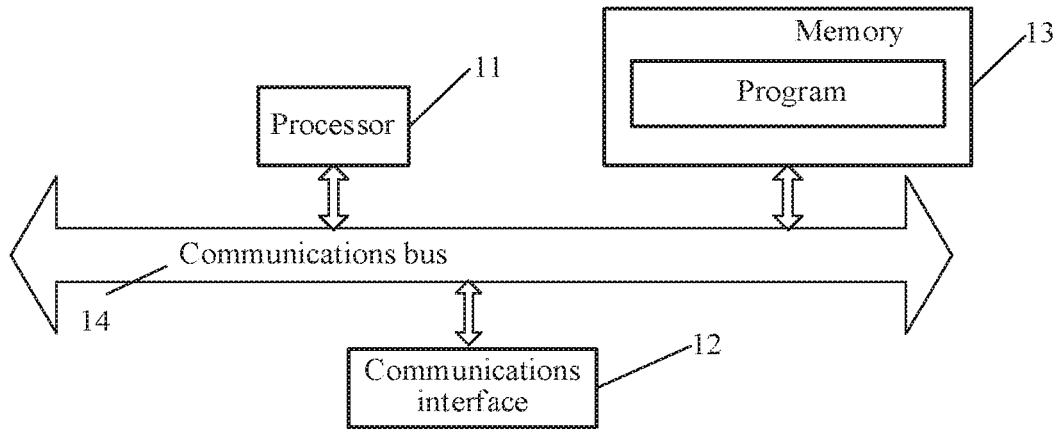
FIG. 1 is a block diagram of a hardware structure of a server according to an embodiment of the disclosure.

FIG. 1 is a block diagram of a hardware structure of a server according to an embodiment of the disclosure. Referring to FIG. 1, the hardware structure of the server may include: at least one processor 11, at least one communications interface 12, at least one memory 13, and at least one communications bus 14.

In this embodiment of the disclosure, there are at least one processor 11, at least one communications interface 12, at least one memory 13, and at least one communications bus 14, and communication among the processor 11, the communications interface 12, and the memory 13 is implemented by using the communications bus 14.

The processor 11 may be a processing circuitry such as a central processing unit (CPU), a graphics processing unit (GPU), or an application-specific integrated circuit (ASIC), or is configured as one or more integrated circuits that implement the embodiments of the disclosure.

The memory 13 may include a non-transitory computer-readable storage medium, such as a high-speed random access memory (RAM), or may include a non-volatile memory, for example, at least one magnetic disk memory.

The memory stores a program, the processor may execute the program stored in the memory, for performing a method including: performing face detection on an image to obtain a face image, and performing face recognition on the face image in the image by using a target face recognition model to obtain a face feature. The method further includes generating the target face recognition model by using the following generating method: determining a training sample, the training sample including a face image calibrated with identity information; and training a general face recognition model by using the training sample, and updating a parameter of the general face recognition model based on a training target to obtain the target face recognition model, the training target being that a prediction result of the general face recognition model on identity information of a face image in the training sample approaches the calibrated identity information of the face image in the training sample.

The method may be applied to a plurality of scenarios for identity recognition. For example, the method may be applied to a community monitoring scenario. Specifically, for a user entering and leaving a community, a user image is shot, and face detection is performed on the image to obtain a face image. Then, face recognition is performed on the face image in the image by using a target face recognition model to obtain a face feature. Because the target face recognition model is obtained by training the general face recognition model by using a face image calibrated with identity information, and can output a face feature having relatively high discrimination, user identity information can be accurately predicted. For another example, the method may be applied to an album management system of a company. In a process of using an album, if a new image is to be saved in the album, face detection and face recognition may be performed on the image by using the face recognition method of the disclosure to obtain a face feature, user identity information in the image is predicted based on the face feature, and then, the image in the album is managed according to the identity information.

Optionally, for refined functions and extended functions of the program, refer to the following description.

To facilitate detailed description of the face recognition method provided in the embodiments of the disclosure, a method for generating a target face recognition model provided in the embodiments of the disclosure is first described in detail.

Figure 2:
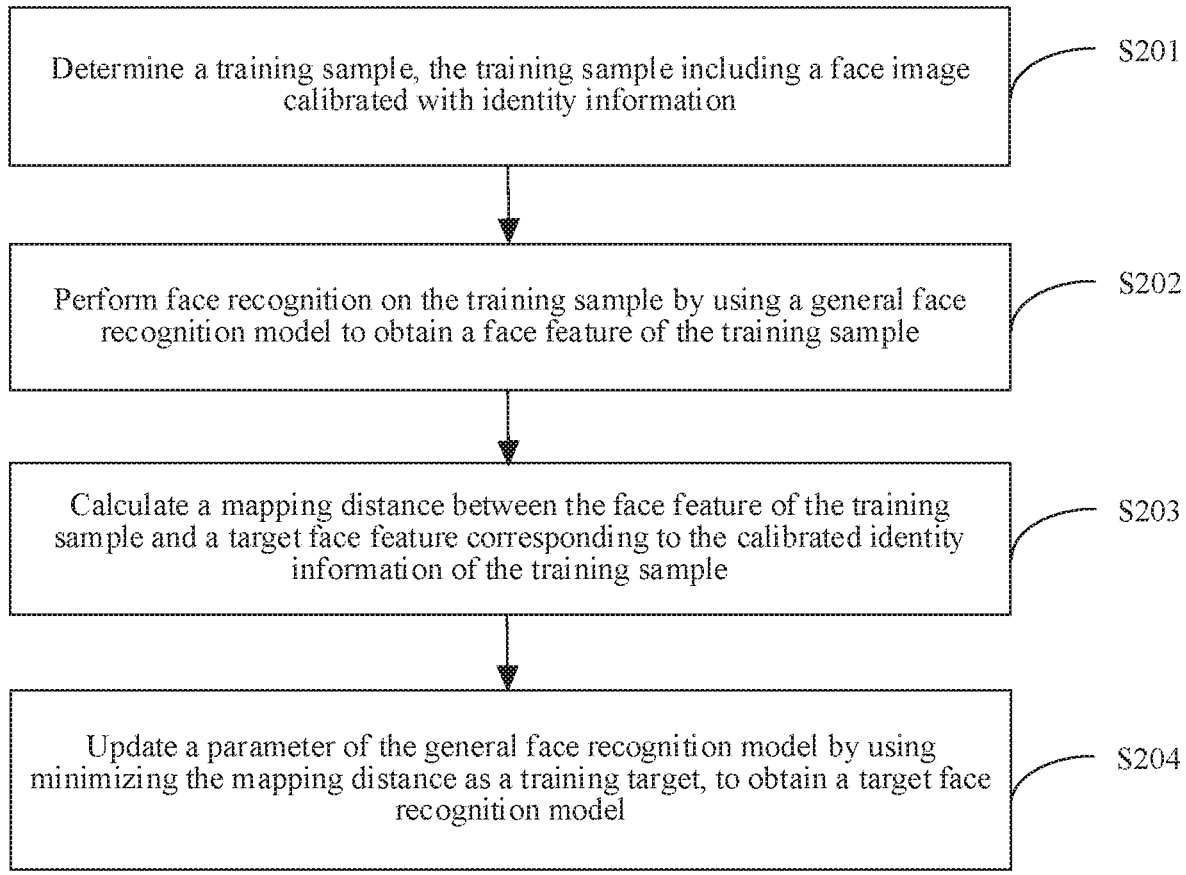
FIG. 2 is a flowchart of a method for generating a target face recognition model according to an embodiment of the disclosure.

FIG. 2 is a flowchart of a method for generating a target face recognition model according to an embodiment of the disclosure.

As shown in FIG. 2, the method includes the following steps:

In step S201, a training sample is determined, the training sample including a face image calibrated with identity information.

In this embodiment of the disclosure, for example, each face image that is calibrated with identity information and that is provided by a user may be used as a training sample.

Optionally, in an application process of an image management technology, if the image management technology is applied to an image management application program, an image to be stored to the image management application program or already stored in the image management application program may be used as an image related to the image management application program.

Optionally, the image related to the image management application program may be seen as an image in a user-associated storage space. In this embodiment of the disclosure, for example, each target image in the image related to the image management application program (each image that is within a specified image management range and that is related to the image management application program is seen as a target image) may be seen as an image in a user-specified storage space.

Further, an image in a storage space associated with a user's friend who opens an image management permission for the user may also be seen as the image in the user-specified storage space. That is, friend users of the user are determined, and a target friend user who opens an image management permission for the user is determined from the determined friend users. An image in a storage space associated with the target friend user may be considered as the image in the user-specified storage space.

If an image open range is specified in the image management permission opened by the target friend user for the user, the image in the image open range and in the storage space associated with the target friend user is considered as the image in the user-specified storage space.

Optionally, the user may calibrate the identity information for the face image in the image of the user-specified and/or associated storage space, and further, each face image calibrated with the identity information may be considered as the face image that is calibrated with the identity information and that is provided by the user. For example, when storing an image in the image management application program, the user may calibrate the identity information of any one or more face images in the image.

If there is a plurality of face images in the image, the user may separately calibrate identity information of a face in each face image in the image. The identity information of the face in the face image calibrated by the user is the identity information of the face image calibrated by the user. In the situation that a label does not correspond to the image due to inaccurate face detection exists in a multi-person image, after the user uploads the multi-person image, a detection result for the multi-person image may be further returned for the user to perform secondary confirmation until the calibrated identity information is in a one-to-one correspondence with the faces in the multi-person image.

Optionally, for each piece of calibrated identity information, a plurality of face images calibrated with the identity information may be provided by the user. In this embodiment of the disclosure, for example, for the same calibrated identity information, 5 to 10 images calibrated with that identity information may be provided by the user.

In this embodiment of the disclosure, for example, after the face image calibrated with the identity information is determined, a target face feature corresponding to the identity information may be calculated based on face images calibrated with the same identity information. During specific implementation, for each piece of calibrated identity information, the target face feature corresponding to the identity information may be separately calculated according to each face image calibrated with the identity information.

Optionally, for the same calibrated identity information, the calculation is as follows: determining each face image calibrated with the same identity information, recognizing the determined face feature of each face image according to the general face recognition model, and determining an average value of the recognized face features as the target face feature corresponding to the identity information.

In this embodiment of the disclosure, in addition to using the face image that is calibrated with the identity information and that is provided by the user as the training sample, the following process may be further performed for each piece of calibrated identity information: from the image storage space, for example, in the user-specified or associated storage space, obtaining an additional face image whose the face feature matches the target face feature corresponding to the identity information, calibrating the obtained additional face image with the same identity information corresponding to the target face feature, and further using each obtained additional face image calibrated with the same identity information as a training sample. In this way, diversity of training samples can be ensured, and quality of the training samples can be improved.

In this embodiment of the disclosure, for example, to improve precision of a training result of the general face recognition model, for each piece of calibrated identity information, the training sample that is calibrated with the identity information and that has a number of training images greater than a preset quantity may be obtained to train the general face recognition model. Optionally, the preset quantity may be 100. The foregoing is merely an exemplary mode of the preset quantity provided in the embodiments of the disclosure. Specifically, a user may set specific preset quantity according to requirements. Details are not described herein.

Further, in the determined training samples, if the training sample calibrated with identity information not only includes a face image that is calibrated with the identity information that is provided by the user, but also includes a face image obtained from the user-specified or associated storage space according to a target face feature corresponding to identity information, the target face feature corresponding to the identity information may be updated based on each training sample in which the target face feature is detected and which is calibrated with the identity information. That is, the average value of the face features of the training samples calibrated with the identity information is reused as the target face feature corresponding to the identity information when a face image obtained from the user-specified or associated storage space is processed.

In this embodiment of the disclosure, for example, when a similarity between two face features is greater than a preset similarity threshold, it may be regarded that the two face features match. Correspondingly, if a similarity between a detected face feature and the target face feature is greater than the preset similarity threshold, it may be regarded that the detected face feature matches the target face feature. Optionally, the preset similarity threshold is 85%.

The foregoing is merely an exemplary mode of determining that the two face features match provided in the embodiments of the disclosure. Specifically, the user may set a condition that the two face features match according to the requirement of the user. Details are not described herein.

In step S202, face recognition is performed on the training sample by using the general face recognition model to obtain a face feature of the training sample. In an embodiment, face recognition is performed on a new training face image by using the general face recognition model to obtain a face feature of the new training face image.

In this embodiment of the disclosure, for example, the general face recognition model is trained by using each face image calibrated with the identity information as the training sample and using the prediction result of the general face recognition model predicting the identity information of the face in the new training sample to be the calibrated identity information of the training sample as the training target, so as to obtain the target face recognition model.

Optionally, the training sample as input information may be inputted into the general face recognition model to output the face feature of the training sample. The general face recognition model includes a face verification model. The face verification model is used for performing feature extraction on the face image to obtain the face feature, for example, performing feature extraction on a normalized face image to obtain a 512-dimensional face feature. In some possible implementations, the face verification model may be a deep convolutional neural network model, which at least includes: an input layer, a convolutional layer, a pooling layer, a local convolutional layer, a fully connected layer, and an output layer. A quantity of convolutional layers, pooling layers, and local convolutional layers and a connection mode may be set according to actual requirements. The pooling layer may be a maximum pooling layer. The output layer is implemented through a softmax loss function. Because the face image calibrated with the identity information may include one face, or may include a plurality of faces, based on this, a center loss function may be added to the output layer for constraint, so that model robustness is provided.

In step S203, a mapping distance is calculated between the face feature of the training sample and the target face feature corresponding to the calibrated identity information of the training sample. In an embodiment, a mapping distance is calculated between the obtained face feature of the new training face image and a target face feature corresponding to the calibrated identity information of the training face image in the training sample.

In step S204, a parameter of the general face recognition model is updated by using minimizing the mapping distance as the training target, to obtain the target face recognition model. In an embodiment, the parameter of the general face recognition model is updated by minimizing the mapping distance, to obtain the target face recognition model.

Optionally, the general face recognition model is trained by using the training samples to obtain the target face recognition model. In the process of training the general face recognition model, the face feature of the new training sample is recognized based on the currently trained general face recognition model, the mapping distance between the face feature of the new training sample and the target face feature corresponding to the calibrated identity information of a training face image is calculated, and the parameter of the currently trained general face recognition model is updated by minimizing the mapping distance as the training target, to obtain the target face recognition model.

In this embodiment of the disclosure, for example, the mapping distance between the new face feature and the target face feature includes a loss function obtained through calculation based on the new face feature and the target face feature. Further, the parameter of the currently trained general face recognition model is updated by minimizing the loss function as a training target, to obtain the target face recognition model.

In actual application, after the target face recognition model is obtained through training, the target face recognition model may further be detected by using samples in addition to the training sample, so as to determine precision of face image recognition. The precision of the face image recognition may be represented by mean average precision (mAP), and specifically refers to precision of the face image recognition in a case of maximum recall. In an example, the determined samples may be divided into two parts according to a preset ratio. One part is used for training, and one part is used for testing. The preset ratio may be set according to user requirements. In an example, the preset ratio may be 80%:20%.

Figure 3:
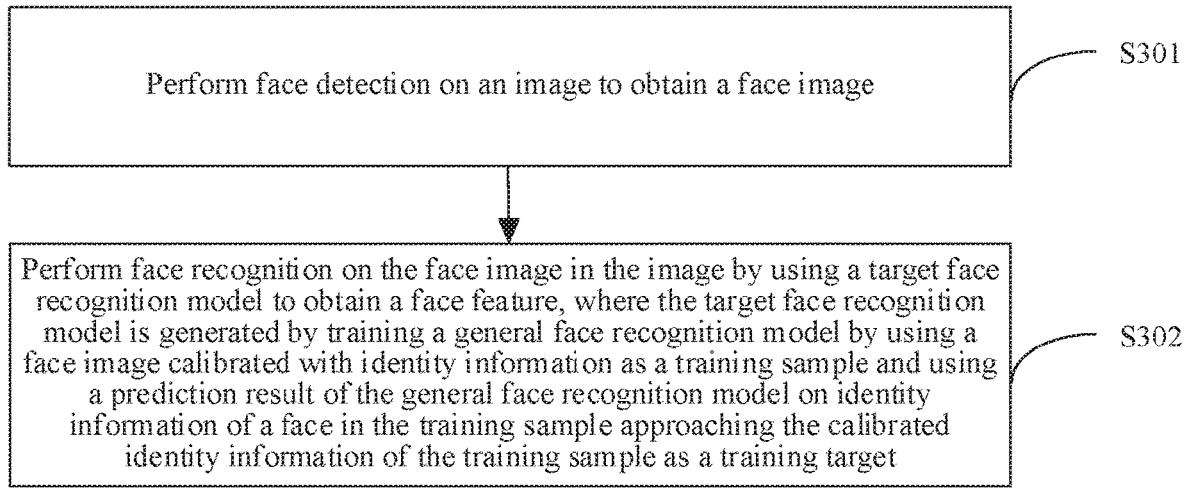
FIG. 3 is a flowchart of a face recognition method according to an embodiment of the disclosure.

The target face recognition model generated based on the foregoing embodiments of the disclosure may perform face recognition on the image in the user-specified or associated storage space. Specifically, FIG. 3 is a flowchart of a face recognition method according to an embodiment of the disclosure. As shown in FIG. 3, the method includes the following steps:

In step S301, face detection is performed on an image to obtain a face image.

The performing face detection on an image may be specifically performing face detection on an image in a user-specified storage space, or may be performing face detection on an image in a user-associated storage space. Optionally, a face detection technology in which face detection is performed on an image to obtain a face image in the image is the related art, and is not described in detail herein.

In step S302, face recognition is performed on the face image in the image by using a target face recognition model to obtain a face feature.

The target face recognition model is generated by training a general face recognition model by using a face image calibrated with identity information as a training sample and using a prediction result of the general face recognition model predicting identity information of a face in a new training sample to be the calibrated identity information of a training face image in the training sample as a training target.

During specific implementation, the target face recognition model may be a target face recognition model pre-trained based on the method for generating a target face recognition model according to the foregoing embodiments, or may be a target face recognition model trained based on the method for generating a target face recognition model according to the foregoing embodiments after step S301 is performed completely, which is not limited herein.

Figure 4:
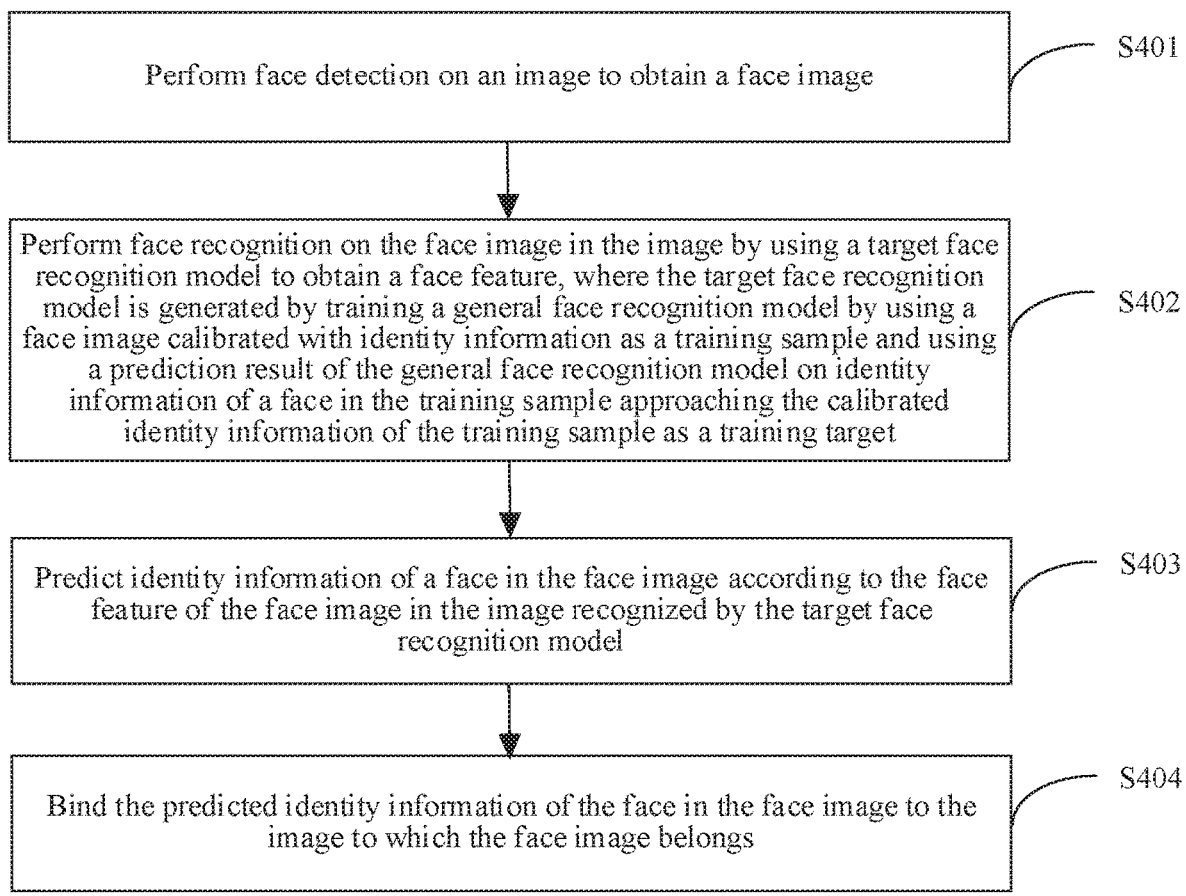
FIG. 4 is a flowchart of another face recognition method according to an embodiment of the disclosure.

FIG. 4 is a flowchart of another face recognition method according to an embodiment of the disclosure.

As shown in FIG. 4, the method includes the following steps:

In step S401, face detection is performed on an image to obtain a face image.

In step S402, face recognition is performed on the face image in the image by using a target face recognition model to obtain a face feature.

The target face recognition model is generated by training a general face recognition model by using a face image that is calibrated with identity information and that is provided by a user as a training sample and using a prediction result of the general face recognition model on identity information of a face in a new training face image being the calibrated identity information of the training sample as a training target.

Optionally, an execution process of step S401 and step S402 provided in the embodiments of the disclosure is the same as an execution process of step S301 and step S302 provided in the foregoing embodiments. For the execution process of step S401 and step S402, refer to the descriptions of the execution process of step S301 and step S302 in the foregoing embodiments. Details are not described herein again.

Further, compared with the face recognition method shown in FIG. 3 provided in the foregoing embodiments, after step S402, the face recognition method shown in FIG. 4 provided in this embodiment of the disclosure further includes step S403, in which identity information of a face in the face image is predicted according to the face feature of the face image in the image recognized by the target face recognition model.

Optionally, after the face feature of the face image in the image is recognized according to the target face recognition model, the identity information of the face in the face image may be predicted according to the recognized face feature of the face image.

Optionally, the predicting identity information of a face in the face image according to the recognized face feature of the face image includes: determining a target face feature matching the recognized face feature of the face image, and using identity information corresponding to the determined target face feature as the predicted identity information of the face in the face image.

The target face recognition model is generated through the training sample by using the prediction result of the general face recognition model on the identity information of the face in a new training sample being the calibrated identity information of the face image in the training sample as the training target, and therefore can better discriminate between face features, so that the target face recognition model has relatively high recognition precision.

In this embodiment of the disclosure, for example, with the prediction of the identity information of the face in the face image (for example, the face image in the user-specified or associated storage space), the target face feature corresponding to the identity information may be further updated. For example, after the identity information of the face in the face image is predicted according to the recognized face feature of the face image, the predicted identity information is calibrated for the face image. Further, the target face feature corresponding to the identity information is updated to an average value of the face features of the face images calibrated with the identity information.

In step S404, the predicted identity information of the face in the face image is bound to the image to which the face image belongs.

Further, a face recognition method provided in the embodiments of the disclosure may further include: binding the predicted identity information of the face in the face image in step S403 to the image to which the face image belongs.

For example, if images on which face recognition is to be performed is an image 1 and an image 2, the image 1 includes two face images (a face image 1 and a face image 2 respectively), and the image 2 includes one face image (a face image 3). Based on a face recognition method provided in the embodiments of the disclosure, if it is predicted that identity information of a face in the face image 1 is identity information 2, identity information of a face in the face image 2 is identity information 1, and identity information of a face in the face image 3 is identity information 1, the identity information 1 is bound to the image 1 and the image 2, and the identity information 2 is bound to the image 1.

Optionally, the predicted identity information of the face in the face image is bound to the image to which the face image belongs, so that when the user searches for the image corresponding to the identity information/the user searches for the identity information of each face image in the image, a corresponding search result may be directly obtained according to a binding relationship between the identity information and the image.

Optionally, in this embodiment of the disclosure, on the basis that the identity information of the face in the face image predicted in the step S403 is not bound to the image to which the face image belongs, as long as the identity information of the face in the face image in the image can be recognized based on the target face recognition model, the identity information of the face in each face image included in the image may be determined. For example, if three face images, a face image 1, a face image 2 and a face image 3, are displayed in one image, and based on the target face recognition model, identity information of a face in the face image 1 is recognized as identity information 1, identity information of a face in the face image 2 is identity information 2, and identity information of a face in the face image 3 is identity information 1, it may be further determined that face images of two persons having different identity information, the face image of the person whose identity information is the identity information 1 and the face image of the person whose identity information is the identity information 2, are displayed in the image.

Further, after a face recognition method provided in the embodiments of the disclosure generates the target face recognition model based on the method for generating a target face recognition model provided in the foregoing embodiments, the method further includes: determining a target friend user from friend users of a user in response to a target face recognition model sharing request, and sharing the target face recognition model to the target friend user.

Optionally, after the general face recognition model is trained through the training sample (the training sample includes the face image that is calibrated with the identity information that is provided by the user) to generate the target face recognition model, the generated target face recognition model may be shared to the target friend user (the target friend user is one or more friend users selected from the friend users of the user) in response to the target face recognition model sharing request transmitted by the user.

For example, in an application process of an image management technology, when the image management technology is applied to an image management application program, after generating the target face recognition model by using the face image that is calibrated with the identity information that is provided by the user, the image management application program may receive the target face recognition model sharing request transmitted by the user, obtain friend users of the user after receiving the target face recognition model sharing request, and display the friend users of the user through the image management application program, so that the user may select one or more friend users from the displayed friend users as the target friend users, and share the target face recognition model to each target friend user. Specifically, after the target face recognition model sharing request transmitted by the user is received, a friend user account of each friend user of the user (for example, friend user accounts of a user account of the user are obtained) may be obtained, and each friend user account is displayed through the image management application program (when a friend user account of a friend user is displayed, information for indicating the friend user may be further displayed), so that the user may select one or more friend user accounts from the displayed friend user accounts as the target friend users, and share the target face recognition model to each target friend user account.

In actual application, the target face recognition model may be used for supporting an album management system of a company and the sharing the target face recognition model to the target friend user may be specifically: sharing the target face recognition model to an album management system of another company or an album management system of a department.

Figure 5:
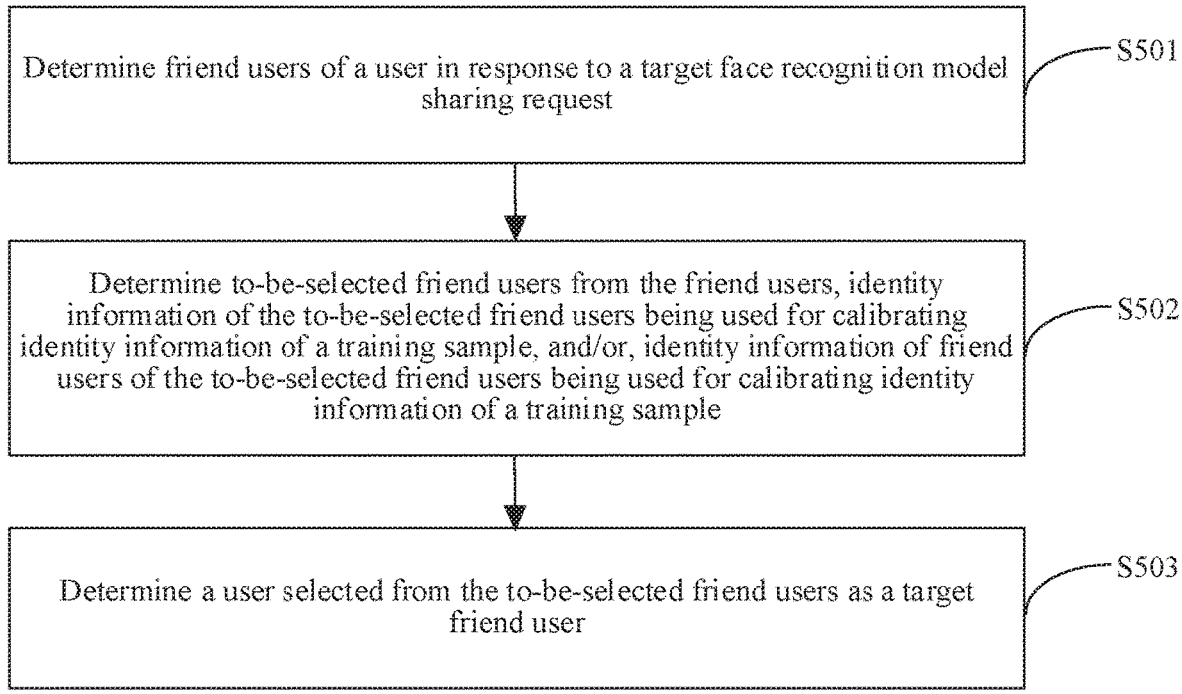
FIG. 5 is a flowchart of a method for determining a target friend user from friend users of a user in response to a target face recognition model sharing request transmitted by the user according to an embodiment of the disclosure.

FIG. 5 is a flowchart of a method for determining a target friend user from friend users of a user in response to a target face recognition model sharing request according to an embodiment of the disclosure.

As shown in FIG. 5, the method includes the following steps:

In step S501, friend users of a user are determined in response to a target face recognition model sharing request.

Specifically, friend user accounts of a user account of the user may be determined in response to the target face recognition model sharing request transmitted by the user, each friend user account representing a friend user.

In step S502, to-be-selected friend users are determined from the friend users, identity information of the to-be-selected friend users being used for calibrating the identity information of the training sample, and/or, identity information of friend users of the to-be-selected friend users being used for calibrating the identity information of the training sample. In an embodiment, to-be-selected friend users are determined from the friend users, identity information of the to-be-selected friend users being used as the calibrated identity information of the training face image in the training sample, or identity information of friend users of the to-be-selected friend users being used as the calibrated identity information of the training face image in the training sample.

Optionally, the identity information of the to-be-selected friend users is identity information used for calibrating the training sample, and/or, the identity information of friend users of the to-be-selected friend users is identity information used for calibrating the training sample, so that when a to-be-selected user receives the target face recognition model, the target face recognition model may be used to obtain a relatively good recognition effect on the to-be-selected user and/or a friend user of the to-be-selected user.

In step S503, a user is selected from the to-be-selected friend users as the target friend user. In an embodiment, one of the to-be-selected friend users is determined as the target friend user.

Optionally, after the to-be-selected friend users are determined from the friend users, the determined to-be-selected friend users may be displayed in the image management application program, so that the user may perform a selection operation on the displayed to-be-selected friend users, and each to-be-selected friend user selected by the user is used as a target friend user.

Further, in a face recognition method provided in the embodiments of the disclosure, each piece of identity information used for calibrating the face images of the training sample may be associated with one piece of attribute information. The attribute information is used for checking the recognized face feature.

In this embodiment of the disclosure, for example, the attribute information includes address information. The address information indicates an address range. Optionally, after the face feature of the face image in the image in the user-specified or associated storage space is recognized based on the target face recognition model, the target face feature matching the recognized face feature may be determined, and further the identity information matching the determined target face feature is determined as the identity information of the face image. Further, attribute information associated with the identity information may be determined to obtain address information of a person with the identity information, and further, as long as a shooting address of an image to which the face image belongs is obtained, and the shooting address is within the address range indicated by the address information, the face feature of the face image recognized based on the target face recognition model may be determined to be accurate.

In other possible implementations of this embodiment of the disclosure, the attribute information may further include any one or more of a gender, an age (or an age group), and an image shooting time. Correspondingly, the recognized face feature may be checked based on information such as the gender, the age, and the image shooting time.

Figure 6:
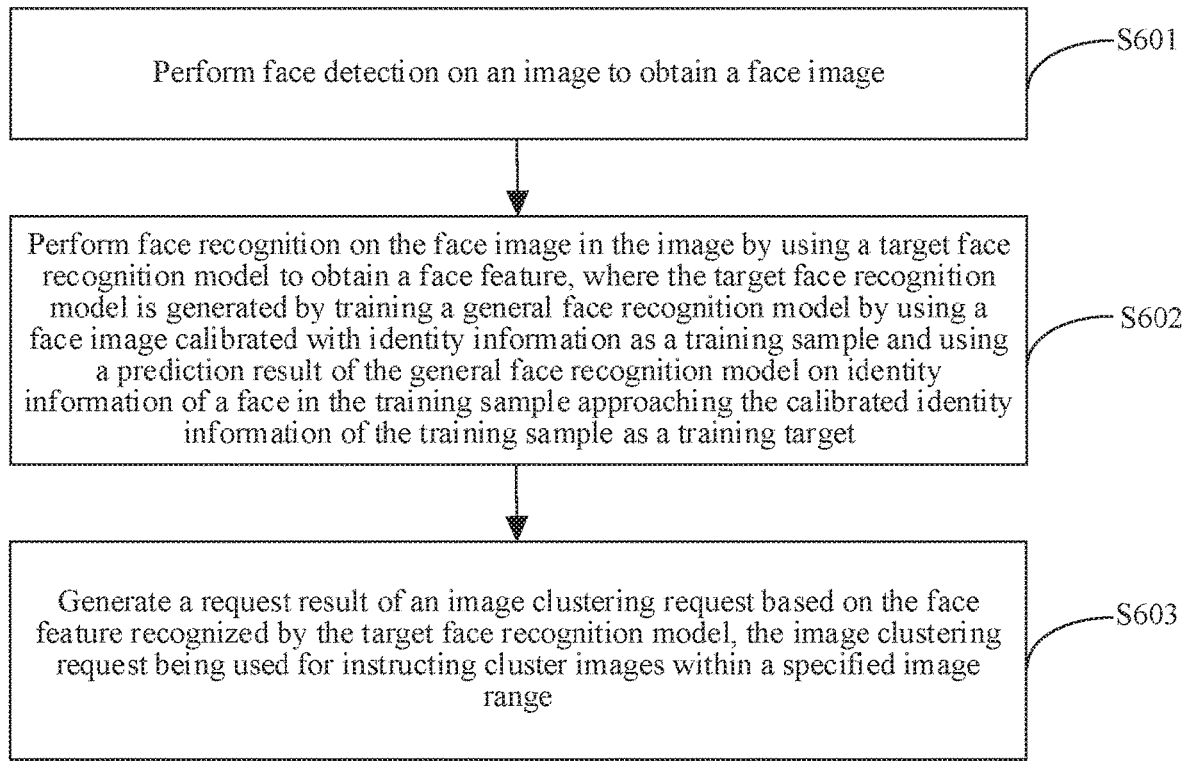
FIG. 6 is a flowchart of still another face recognition method according to an embodiment of the disclosure.

FIG. 6 is a flowchart of still another face recognition method according to an embodiment of the disclosure. As shown in FIG. 6, the method includes the following steps:

In step S601, face detection is performed on an image to obtain a face image.

In step S602, face recognition is performed on the obtained face image in the image by using a target face recognition model to obtain a face feature.

The target face recognition model is generated by training a general face recognition model by using a face image that is calibrated with identity information that is provided by a user as a training sample and using a prediction result of the general face recognition model predicting identity information of a new face image in the training sample to be the calibrated identity information of the training sample as a training target.

Optionally, an execution process of step S601 and step S602 provided in the embodiments of the disclosure is the same as the execution process of step S301 and step S302 provided in the foregoing embodiments. For the execution process of step S601 and step S602, refer to the descriptions of the execution process of step S301 and step S302 in the foregoing embodiments. Details are not described herein again.

In step S603, a request result of an image clustering request is generated based on the face feature recognized by the target face recognition model, the image clustering request being used for instructing to cluster images within a specified image range.

Further, compared with the face recognition method shown in FIG. 3 provided in the foregoing embodiments, after step S602, the face recognition method shown in FIG. 6 provided in this embodiment of the disclosure further includes step S603 in which the request result of the image clustering request is generated based on the face feature of the image in the user-specified or associated storage space recognized by the target face recognition model, the image clustering request being used for instructing to cluster the images within the specified image range in the user-specified or associated storage space.

In this embodiment of the disclosure, for example, in an application process of an image management technology, if the image management technology is applied to an image management application program, the image management application program may receive the image clustering request transmitted by the user, the image clustering request being used for instructing to cluster the images within the specified image range in the user-specified or associated storage space. After receiving the image clustering request, the image management application program may first determine the images within the specified image range of the image clustering request in the user-specified or associated storage space, recognize the face feature of the face image in each determined image based on the target face recognition model, and further cluster the determined images according to the face features of the face images to obtain at least one image category. For example, images including face images with matched face features are classified into one category.

During image management, face detection and face recognition are performed on images to obtain face features, and then, the clustering is performed based on a similarity between the face features of each image, so that the image can be managed according to the identity information. In this way, the user may conveniently search for all images of any user.

Figure 7:
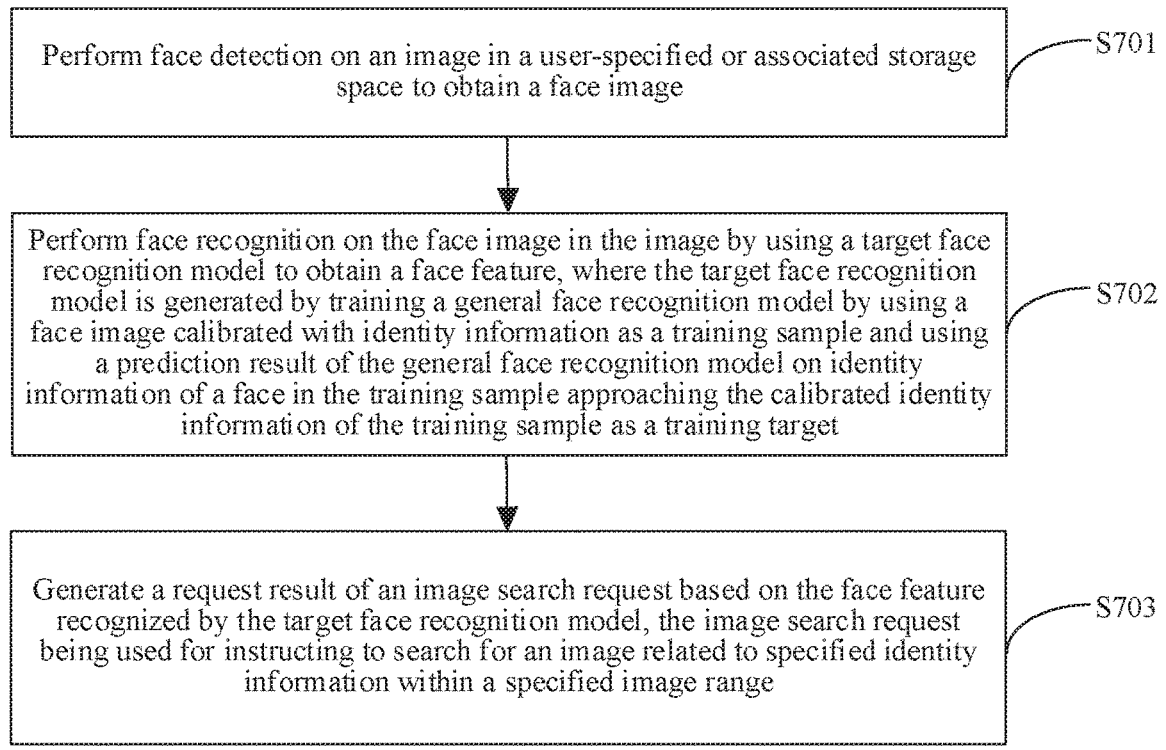
FIG. 7 is a flowchart of still another face recognition method according to an embodiment of the disclosure.

FIG. 7 is a flowchart of still another face recognition method according to an embodiment of the disclosure. As shown in FIG. 7, the method includes the following steps:

In step S701, face detection is performed on an image to obtain a face image.

In step S702, face recognition is performed on the face image in the image by using a target face recognition model to obtain a face feature.

The target face recognition model is generated by training a general face recognition model by using a face image that is calibrated with identity information that is provided by a user as a training sample and by using a prediction result of the general face recognition model predicting identity information of a new training face image in the training sample to be the calibrated identity information of the training sample as a training target.

Optionally, an execution process of step S701 and step S702 provided in the embodiments of the disclosure is the same as the execution process of step S301 and step S302 provided in the foregoing embodiments. For the execution process of step S701 and step S702, refer to the descriptions of the execution process of step S301 and step S302 in the foregoing embodiments. Details are not described herein again.

In step S703, a request result of an image search request is generated based on the face feature recognized by the target face recognition model, the image search request being used for instructing to search for an image related to specified identity information within a specified image range.

Further, compared with the face recognition method shown in FIG. 3 provided in the foregoing embodiments, after step S702, the face recognition method shown in FIG. 7 provided in this embodiment of the disclosure further includes step S703, which the request result of the image search request is generated based on the face feature of the image in the user-specified or associated storage space recognized by the target face recognition model, the image search request being used for instructing to search for the image related to the specified identity information within the specified image range in the user-specified or associated storage space.

In this embodiment of the disclosure, for example, an image including the face image having the specified identity information may be used as an image related to the specified identity information. That is, if an image includes the face image having the specified identity information, the image is seen as the image related to the specified identity information. If the identity information of the face in the face image is the specified identity information, the face image is the face image having the specified identity information.

In this embodiment of the disclosure, for example, a face image having target identity information related to the specified identity information is also seen as an image related to the specified identity information. That is, if an image includes the target identity information related to the specified identity information, the image is seen as the image related to the specified identity information. If the identity information of the face in the face image is the target identity information related to the specified identity information, the face image is the face image having the target identity information related to the specified identity information.

Optionally, the target identity information related to the specified identity information may be identity information that has a family relationship with the specified identity information. The target identity information related to the specified identity information may also be identity information that has a friend relationship with the specified identity information.

The foregoing is merely an exemplary mode of the target identity information provided in the embodiments of the disclosure. Specifically, specific content of the target identity information may be set according to requirements. Details are not described herein.

In this embodiment of the disclosure, for example, in an application process of an image management technology, if the image management technology is applied to an image management application program, the image management application program may receive the image search request transmitted by the user, the image search request instructing to search for the image related to the specified identity information within the specified image range in the user-specified or associated storage space. After receiving the image search request, the image management application program may first determine the images within the specified image range of the image search request in the user-specified or associated storage space, recognize the face feature of the face image in each determined image based on the target face recognition model, and further determine the image to which the face feature matching the target face feature corresponding to the specified identity information belongs from the face features, and/or, determine the image to which the face feature matching the target face feature corresponding to the target identity information related to the specified identity information belongs from the face features.

In actual application, if an image is associated with attribute information, the image search request may further be used for instructing to search for an image related to specified attribute information within the specified range. For example, the image search request may instruct to search for a female image, a child image, a multi-person image, a single-person image, or the like.

In this embodiment of the disclosure, a face recognition method may be further provided. After performing step S601 and step S602 completely, the face recognition method may perform both step S603 and step S703. For a detailed execution process of step S603 and step S703, refer to the description of the foregoing embodiments. Details are not described herein again.

For ease of understanding a face recognition method provided in the embodiments of the disclosure, application scenarios of the face recognition method are described in detail.

Figure 8:
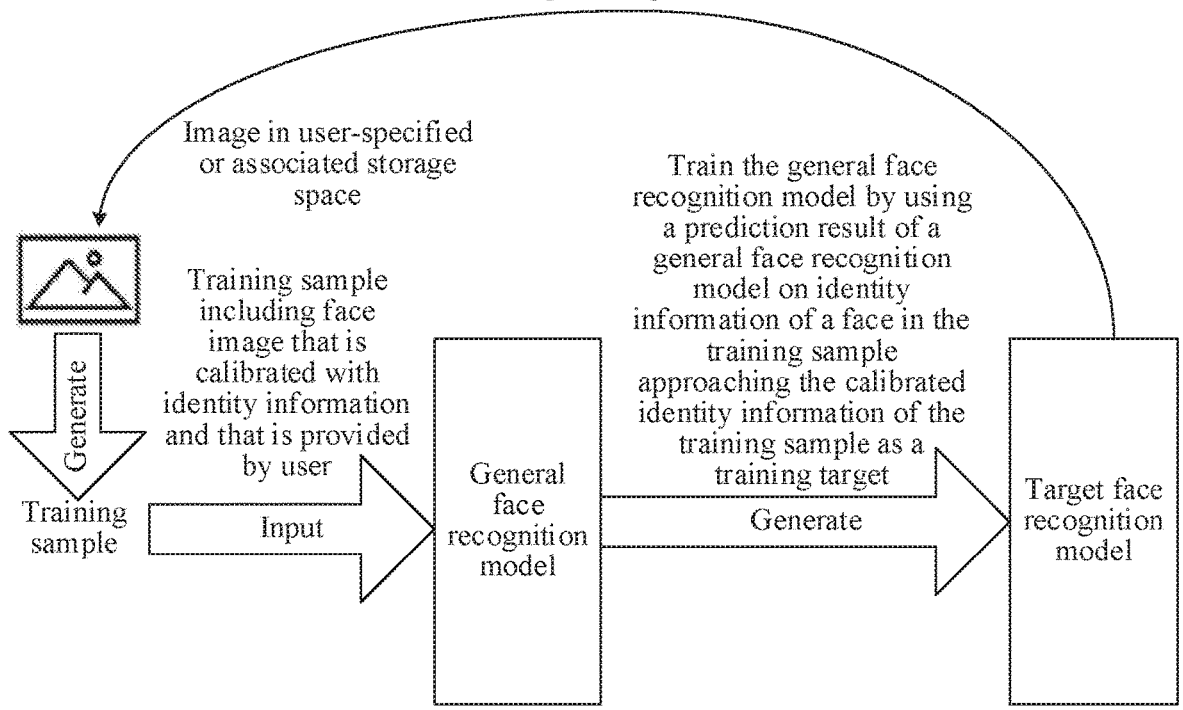
FIG. 8 is a diagram of an image management application scenario according to an embodiment of the disclosure.

A face recognition method provided in the embodiments of the disclosure may be applied to an image management application program. As shown in FIG. 8, the following functions may be included in the image management application program.

As shown in FIG. 8, the image management application program in this embodiment of the disclosure may determine images in a user-specified or associated storage space. The images in the user-associated storage space may be regarded as images related to the image management application program (the images related to the image management application program include an image to be stored to the image management application program or already stored in the image management application program). The images in the user-specified storage space may be regarded as: each image that is within a specified image management range and that is related to the image management application program; or images related to a friend user who opens an image management permission for the user (the images related to a friend user who opens an image management permission for the user include an image that the friend user who opens the image management permission for the user to be stored to an image management application program corresponding to the friend user or already stored in an image management application program corresponding to the friend user).

Optionally, the user may select at least one image from the images in the user-specified or associated storage space, calibrate identity information for the face in the face image in the image selected by the user, and use the face image calibrated with the identity information by the user as a training sample.

Further, for each piece of calibrated identity information, the user may further obtain more face images with the identity information from the user-specified or associated storage space, and use the face image calibrated with the identity information as the training sample. For this process, refer to the detailed description of the foregoing embodiments. Details are not described herein again.

In this embodiment of the disclosure, for example, the training sample is inputted into a general face recognition model, and a prediction result of the general face recognition model predicting identity information of a new training face image in the training sample being the calibrated identity information of the training sample is used as a training target to train the general face recognition model, so as to generate a target face recognition model.

Optionally, the image management application program may implement image management on the images in the user-specified or associated storage space based on a face recognition function of the generated target face recognition model.

Figure 9A:
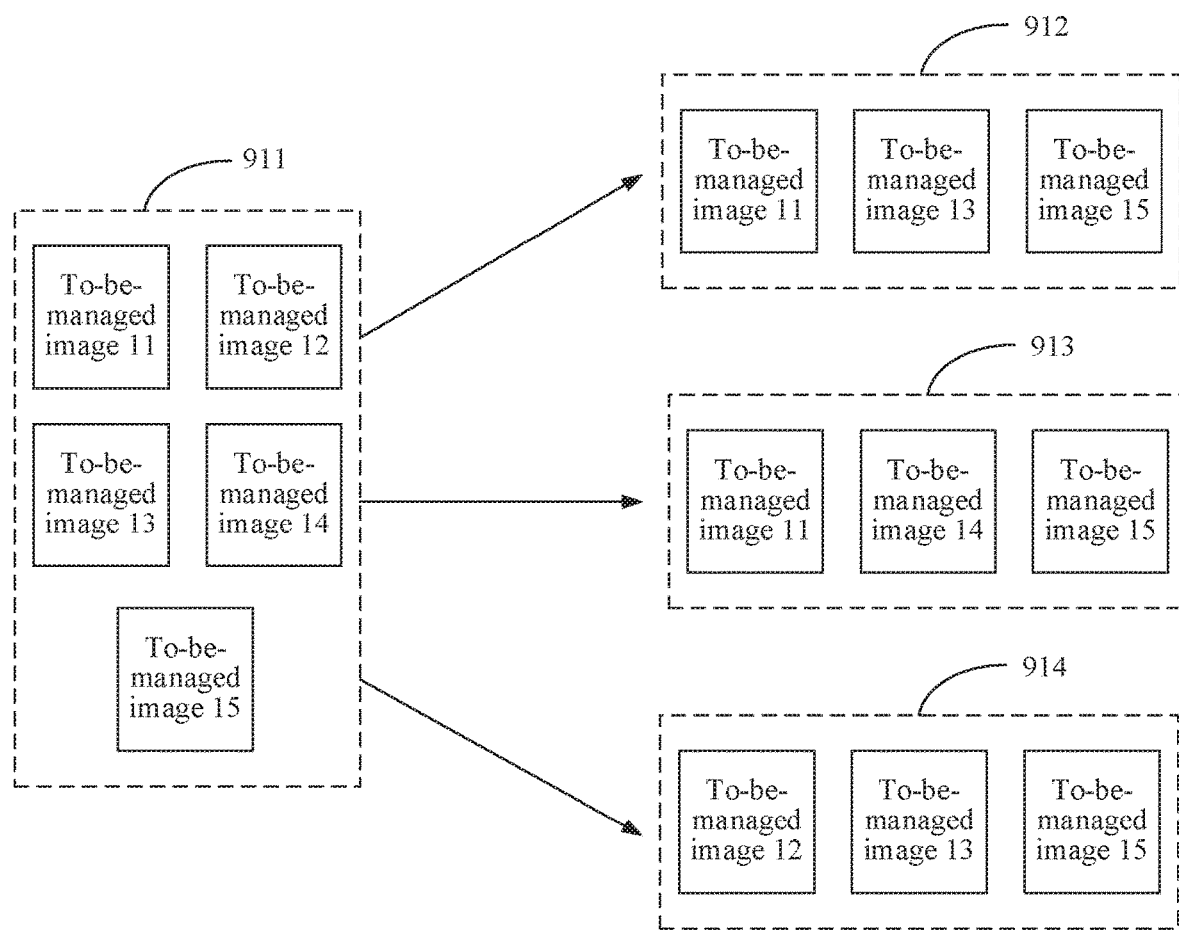
FIG. 9(*a*) is a diagram of another image management application scenario according to an embodiment of the disclosure.

Optionally, FIG. 9(a) is a diagram of another image management application scenario according to an embodiment of the disclosure.

As shown in FIG. 9(a), the images within the specified image range in the user-specified or associated storage space indicated by the image clustering request are a to-be-managed-image set 911. The to-be-managed-image set 911 includes a to-be-managed image 11, a to-be-managed image 12, a to-be-managed image 13, a to-be-managed image 14, and a to-be-managed image 15. A face image whose identity information is identity information 1 and a face image whose identity information is identity information 2 are displayed in the to-be-managed image 11 recognized based on the target face recognition model, a face image whose identity information is identity information 3 is displayed in the to-be-managed image 12, the face image whose identity information is the identity information 1 and the face image whose identity information is the identity information 3 are displayed in the to-be-managed image 13, the face image whose identity information is the identity information 2 is displayed in the to-be-managed image 14, and the face image whose identity information is the identity information 1, the face image whose identity information is the identity information 2, and the face image whose identity information is the identity information 3 are displayed in the to-be-managed image 15.

A clustering processing is performed on the to-be-managed images in the to-be-managed-image set 911 to obtain an image clustering result of the image clustering request. The image clustering result includes three image categories, which are an image category 912 corresponding to the identity information 1, an image category 913 corresponding to the identity information 2, and an image category 914 corresponding to the identity information 3 respectively. The image category 912 includes the to-be-managed image 11, the to-be-managed image 13, and the to-be-managed image 15. The image category 913 includes the to-be-managed image 11, the to-be-managed image 14, and the to-be-managed image 15. The image category 914 includes the to-be-managed image 12, the to-be-managed image 13, and the to-be-managed image 15.

Figure 9B:
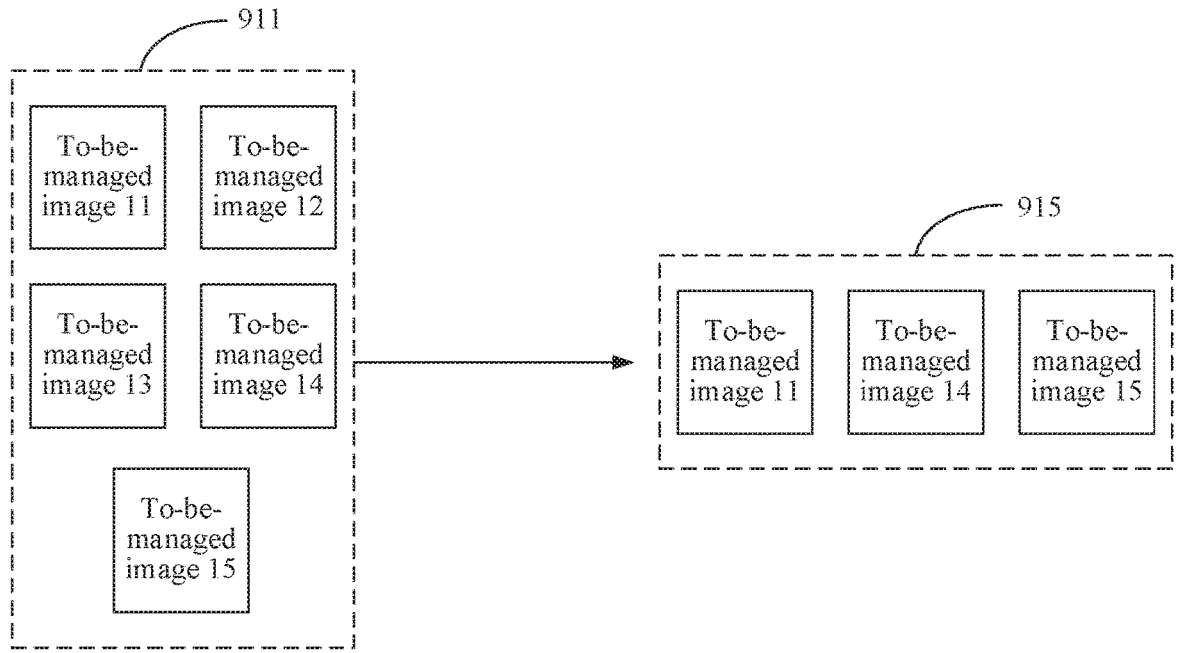

Optionally, FIG. 9(b) is a diagram of still another image management application scenario according to an embodiment of the disclosure.

As shown in FIG. 9(b), the images within the specified image range in the user-specified or associated storage space indicated by the image search request may be the foregoing to-be-managed-image set 911, and the image displayed with the face image including the specified identity information is the image related to the specified identity information, and the image search request specifies the identity information as the identity information 2, search processing is performed in the to-be-managed-image set 911, and the obtained image search result 915 includes the to-be-managed image 11, the to-be-managed image 14, and the to-be-managed image 15.

Figure 9C:
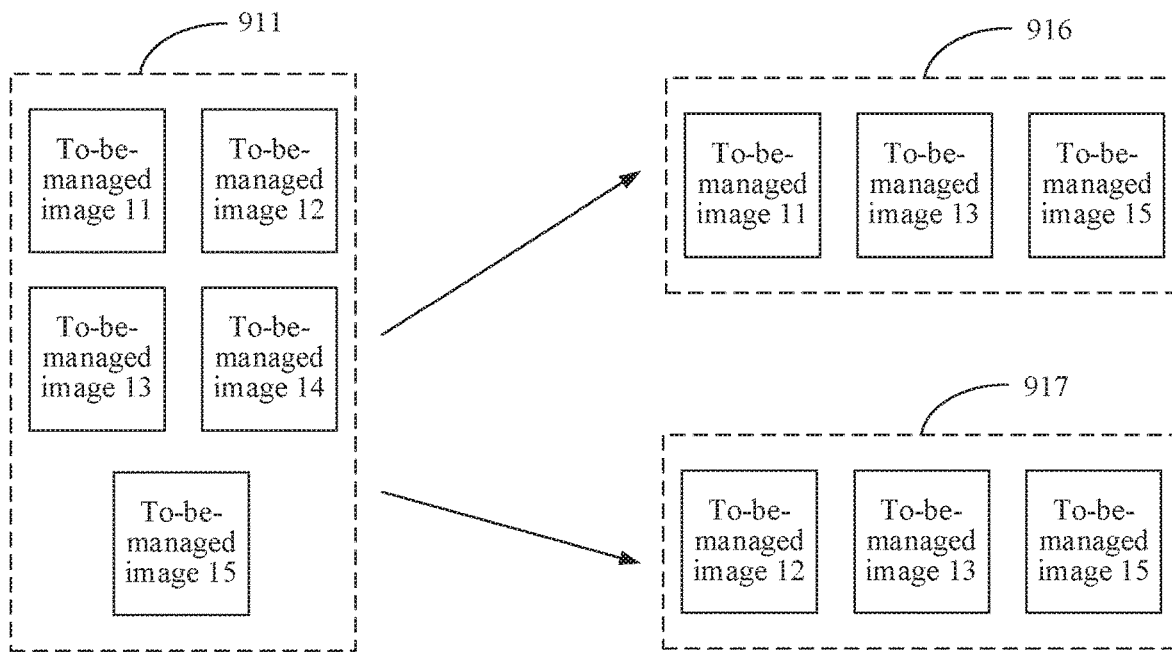
Figure 9D:
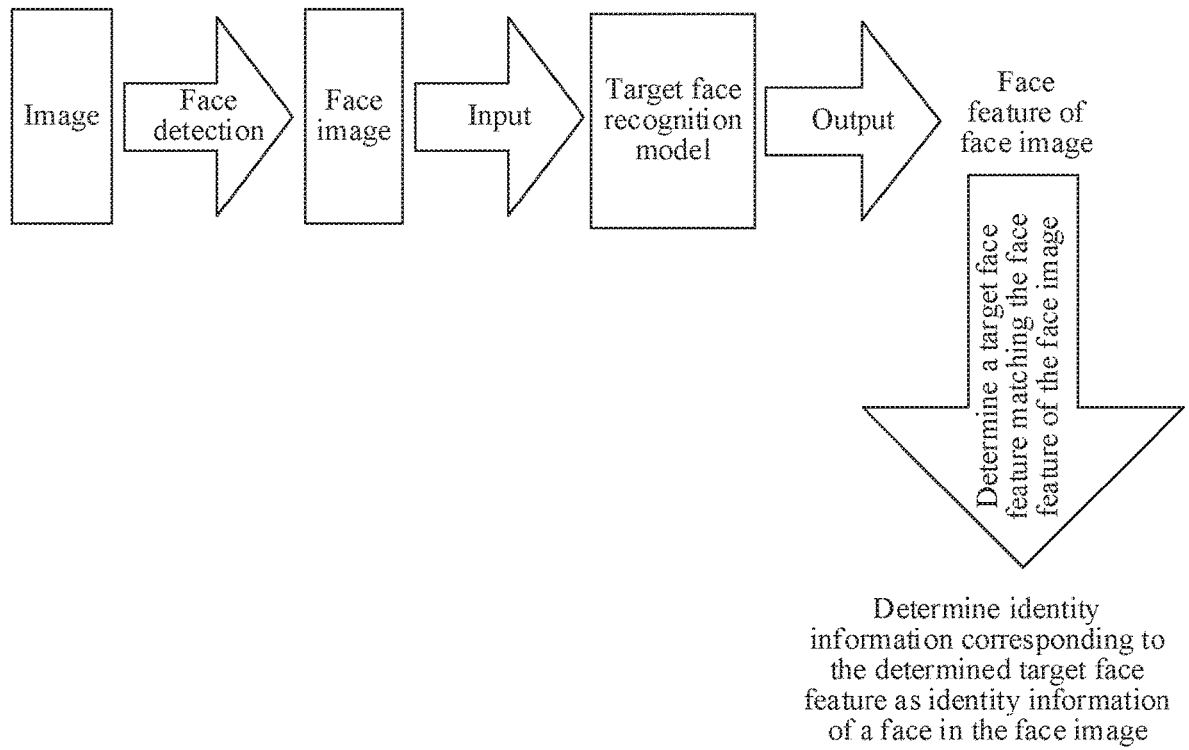

Further, as shown in FIG. 9(c), the images within the specified image range in the user-specified or associated storage space indicated by the image search request may be the foregoing to-be-managed-image set 911, and the image displayed with the face image including the specified identity information is the image related to the specified identity information, and the image search request specifies the identity information as the identity information 1 and the identity information 3, search processing is performed in the to-be-managed-image set 911, and the obtained image search result includes an image category 916 and an image category 917. The image category 916 corresponds to the identity information 1, and the image category 916 includes the to-be-managed image 11, the to-be-managed image 13, and the to-be-managed image 15. The image category 917 corresponds to the identity information 3, and the image category 917 includes the to-be-managed image 12, the to-be-managed image 13, and the to-be-managed image 15.

Further, as shown in FIG. 9(*d*), there is an image whose identity information is to be determined, the image management application program may perform face detection on the image by using an image detection technology to obtain a face image in the image, input the obtained face image to a target face recognition model to obtain a face feature of the face image, and further determine, through a mode of determining a target face feature matching the face feature, identity information corresponding to the determined target face feature as the identity information of a face in the face image. The identity information of the face in each face image in the image whose identity information is to be determined is the identity information of each face displayed in the image whose identity information is to be determined.

Exemplary scenario embodiments are provided above to describe a face recognition method provided in the embodiments of the disclosure. According to requirements, specific application scenarios may be set related to the face recognition method provided in the embodiments of the disclosure. Details are not limited herein.

The disclosure provides a face recognition apparatus, and a server. The method includes: performing face detection on an image in a user-specified or associated storage space to obtain a face image; and performing face recognition on the face image based on a target face recognition model. The target face recognition model is generated by training a general face recognition model by using a face image that is calibrated with identity information that is provided by a user as a training sample and using a prediction result of the general face recognition model predicting identity information of a new training face image in the training sample to be the calibrated identity information of the training sample as a training target. Therefore, the target face recognition model is more discriminative to a recognition result of the face feature of the image in the user-specified or associated storage space, thereby improving precision of image management.

A face recognition apparatus provided in the embodiments of the disclosure is described below, and the face recognition apparatus described below may be regarded as a program module disposed in a server to implement the face recognition method provided in the embodiments of the disclosure. Mutual reference may be made between the content of the face recognition apparatus described below and the content of the face recognition method described above.

Figure 10:
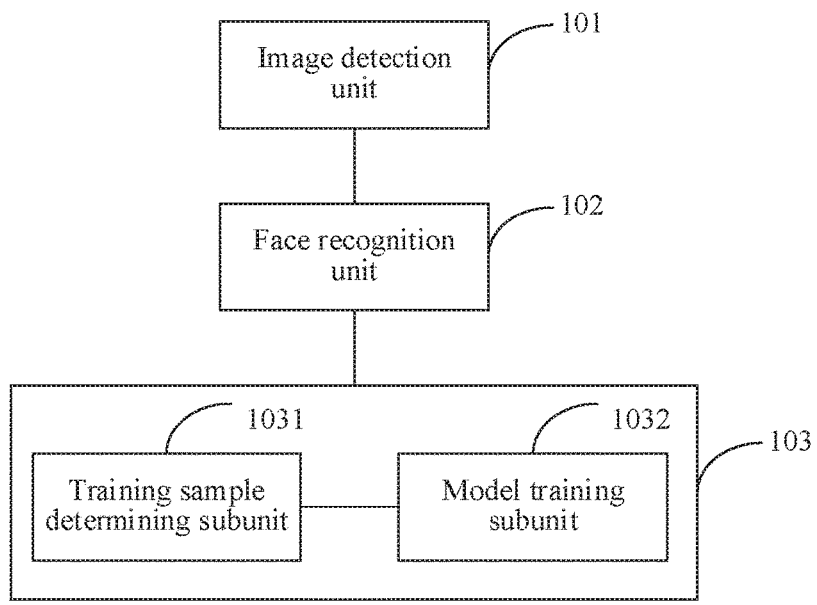
FIG. 10 is a schematic structural diagram of a face recognition apparatus according to an embodiment of the disclosure.

FIG. 10 is a schematic structural diagram of a face recognition apparatus according to an embodiment of the disclosure.

As shown in FIG. 10, the apparatus includes: an image detection unit 101, configured to perform face detection on a user image to obtain a face image; and a face recognition unit 102, configured to perform face recognition on the face image in the image by using a target face recognition model to obtain a face feature, the target face recognition model being generated by using a module generating unit 103, and the module generating unit 103 including: a training sample determining subunit 1031, configured to determine a training sample, the training sample including a face image calibrated with identity information; and a model training subunit 1032, configured to train a general face recognition model by using the training sample, and update a parameter of the general face recognition model based on a training target to obtain the target face recognition model, the training target being that a prediction result of the general face recognition model predicting identity information of a new training face image in the training sample to be the calibrated identity information of the face image in the training sample.

Further, in a face recognition apparatus provided in the embodiments of the disclosure, the model training subunit 1032 includes: a face feature determining subunit, configured to perform face recognition on the new training face image, by using the general face recognition model to obtain a face feature of the new training face image; a mapping distance calculation subunit, configured to calculate a mapping distance between the face feature of the new training face image and a target face feature corresponding to the calibrated identity information of the training sample; and a training subunit, configured to update the parameter of the general face recognition model by minimizing the mapping distance as the training target, to obtain the target face recognition model.

In this embodiment of the disclosure, for example, the training sample determining subunit 1031 is specifically configured to: determine one or more training face images, each calibrated with respective identity information; calculate, based on a set of training face images of the one or more training face image calibrated with the same identity information, a target face feature corresponding to the same identity information; and obtain, from an image storage space, an additional face image whose face feature matches the target face feature, calibrate the obtained additional face image with the same identity information corresponding to the target face feature, and include the additional face image calibrated with the same identity information in the one or more training face images.

Further, the face recognition apparatus provided in the embodiments of the disclosure further includes: an identity information predicting unit, configured to: predict identity information of a face in the face image according to the face feature of the face image in the image recognized by the target face recognition model.

In this embodiment of the disclosure, for example, the identity information is associated with attribute information, the attribute information being used for checking the recognized face feature. In an embodiment, the attribute information being used for confirming the performed face recognition.

Further, the face recognition apparatus provided in the embodiments of the disclosure further includes: a target face recognition model sharing unit, configured to: determine a target friend user from friend users of a user in response to a target face recognition model sharing request, and share the target face recognition model to the target friend user.

In this embodiment of the disclosure, for example, the target face recognition model sharing unit is specifically configured to: determine the friend users of the user in response to the target face recognition model sharing request; determine to-be-selected friend users from the friend users, identity information of the to-be-selected friend users being used for calibrating the identity information of the training sample, and/or, identity information of friend users of the to-be-selected friend users being used for calibrating the identity information of the training sample; and determine a user selected from the to-be-selected friend users as the target friend user.

Further, the face recognition apparatus provided in the embodiments of the disclosure further includes: an image clustering unit, configured to generate a request result of an image clustering request based on the face feature recognized by the target face recognition model, the image clustering request being used for instructing to cluster images within a specified image range.

Further, the face recognition apparatus provided in the embodiments of the disclosure further includes: an image search unit, configured to a request result of an image search request based on the face feature recognized by the target face recognition model, the image search request being used for instructing to search for an image related to specified identity information within the specified image range.

An embodiment of the disclosure further provides a non-transitory storage medium. The storage medium may store a program, which when executed by a processor, causes the processor to perform a method including: performing face detection on an image to obtain a face image; and performing face recognition on the face image in the image by using a target face recognition model to obtain a face feature, and generating the target face recognition model in the following generating method: determining a training sample, the training sample including a face image calibrated with identity information; and training a general face recognition model by using the training sample, and updating a parameter of the general face recognition model based on a training target to obtain the target face recognition model, the training target being that a prediction result of the general face recognition model predicting identity information of a new training face image in the training sample is the calibrated identity information of the face image in the training sample.

Correspondingly, an embodiment of the disclosure further provides a non-transitory computer program product including an instruction, the computer program product, when run on a computer, causing the computer to perform the face recognition method according to any implementation in the embodiments of the disclosure.

Optionally, for refined functions and extended functions of the computer program product, refer to the foregoing description.

The disclosure provides a face recognition apparatus, a storage medium, and a computer program product. Face detection is performed on an image to obtain a face image; and face recognition is performed on the face image in the image by using a target face recognition model to obtain a face feature. The target face recognition model is generated by training a general face recognition model by using a face image that is calibrated with identity information and that is provided by a user as a training sample and using a prediction result of the general face recognition model predicting identity information of a new training face image in the training sample to be the calibrated identity information of the training sample as a training target, and is more discriminative to a recognition result of the face feature of the image, thereby improving precision of image management.

The embodiments in the specification are all described in a progressive manner. For the same or similar parts in the embodiments, refer to the embodiments, and each embodiment focuses on a difference from other embodiments. The apparatus embodiments can be substantially similar to the method embodiments and therefore are only briefly described, and reference may be made to the method embodiments for the associated part.

In combination with the embodiments herein, units and algorithms, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Different methods may be used to implement the described functions for each particular application.

In combination with the embodiments herein, steps of the method or algorithms described may be directly implemented using hardware, a software module executed by a processor, or the combination thereof. The software module may be placed in a non-transitory computer-readable medium, such as a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use the present disclosure. Various modifications to the embodiments are possible, and general principles defined in this specification may be implemented in other embodiments without departing from the spirit or scope of the present disclosure. Therefore, the present application is not limited to the embodiments illustrated in the present disclosure, but conforms to the broadest scope consistent with the principles and novel features disclosed in the present disclosure.

What is claimed is:

1. A face recognition method, comprising:
   generating, by processing circuitry of a server, a target face recognition model, the generating the target face recognition model includes
      determining a training sample, the training sample includes a face image calibrated with identity information,
      training a general face recognition model by using the training sample,
      and
      updating, by the processing circuitry of the server, a parameter of the general face recognition model based on a training target to obtain the target face recognition model, the training target being a prediction result of the general face recognition model predicting identity information of a new training face image in the training sample to be the calibrated identity information of the training face image in the training sample;
   performing, by the processing circuitry of the server, face detection on an image to obtain a first face image; and
   performing, by the processing circuitry of the server, face recognition on the first face image in the image by using the target face recognition model to obtain a first face feature, wherein the updating the parameter of the general face recognition model based on the training target comprises:
   performing face recognition on the new training face image by using the general face recognition model to obtain a face feature of the new training face image;
   calculating a mapping distance between the obtained face feature of the new training face image and a target face feature corresponding to the calibrated identity information of the training face image in the training sample; and
   updating the parameter of the general face recognition model by minimizing the mapping distance, to obtain the target face recognition model.

2. The method according to claim 1, wherein the determining the training sample comprises:
  determining one or more training face images, each calibrated with respective identity information;
  calculating, based on a set of training face images of the one or more training face images calibrated with a same identity information, an identified face feature corresponding to the same identity information; and
  obtaining, from an image storage space, an additional face image whose face feature matches the identified face feature, calibrating the obtained additional face image with the same identity information corresponding to the identified face feature, and including the additional face image calibrated with the same identity information in the one or more training face images.

3. The method according to claim 1 further comprising:
  predicting identity information of a face in the first face image according to the first face feature of the first face image in the image by using the target face recognition model.

4. The method according to claim 1, wherein the identity information is associated with attribute information, the attribute information being used for confirming the performed face recognition on the first face image.

5. The method according to claim 1, further comprising:
  determining a target friend user from friend users of a user in response to a target face recognition model sharing request; and
  sharing the target face recognition model to the target friend user.

6. The method according to claim 5, wherein the determining the target friend user from the friend users of the user in response to the target face recognition model sharing request comprises:
  determining the friend users of the user in response to the target face recognition model sharing request;
  determining to-be-selected friend users from the friend users, identity information of the to-be-selected friend users being used as the calibrated identity information of the training face image in the training sample, or identity information of friend users of the to-be-selected friend users being used as the calibrated identity information of the training face image in the training sample; and
  determining one of the to-be-selected friend users as the target friend user.

7. The method according to claim 1, further comprising:
  generating a request result of an image clustering request based on the first face feature obtained by using the target face recognition model, the image clustering request being used for instructing to cluster images within a specified image range.

8. The method according to claim 1, further comprising:
  generating a request result of an image search request based on the first face feature obtained by using the target face recognition model, the image search request being used for instructing to search for an image related to specified identity information within a specified image range.

9. The method according to claim 1, further comprising:
  determining identity information of the obtained first face feature based on calibrated identity information corresponding to a face feature matching the obtained first face feature.

10. A face recognition apparatus, comprising:
  processing circuitry configured to
    generate a target face recognition model, the generating the target face recognition model includes
      determining a training sample, the training sample including a training face image calibrated with identity information,
      training a general face recognition model by using the training sample,
      and
      updating a parameter of the general face recognition model based on a training target to obtain the target face recognition model, the training target being a prediction result of the general face recognition model predicting identity information of a new training face image in the training sample to be the calibrated identity information of the training face image in the training sample;
    perform face detection on an image to obtain a first face image; and
    perform face recognition on the first face image in the image by using the target face recognition model to obtain a first face feature,
  wherein the processing circuitry is further configured to
    perform the face recognition on the new training face image by using the general face recognition model to obtain a face feature of the new training face image,
    calculate a mapping distance between the obtained face feature of the new training face image and a target face feature corresponding to the calibrated identity information of the training face image in the training sample, and
    update the parameter of the general face recognition model by minimizing the mapping distance, to obtain the target face recognition model.

11. The apparatus according to claim 10, wherein the processing circuitry is further configured to
  determine one or more training face images, each calibrated with respective identity information;
  calculate, based on a set of training face images of the one or more training face images calibrated with a same identity information, an identified face feature corresponding to the same identity information; and
  obtain, from an image storage space, an additional face image whose face feature matches the identified face feature, calibrate the obtained additional face image with the same identity information corresponding to the identified face feature, and include the additional face image calibrated with the same identity information in the one or more training face images.

12. The apparatus according to claim 10, wherein the processing circuitry is further configured to predict identity information of a face in the first face image according to the first face feature of the first face image in the image by the target face recognition model.

13. The apparatus according to claim 10, wherein the identity information is associated with attribute information, the attribute information being used for confirming the performed face recognition on the first face image.

14. The apparatus according to claim 10, wherein the processing circuitry is further configured to:
  determine a target friend user from friend users of a user in response to a target face recognition model sharing request; and
  share the target face recognition model to the target friend user.

15. The apparatus according to claim 14, wherein the processing circuitry is further configured to determine the friend users of the user in response to the target face recognition model sharing request;

determine to-be-selected friend users from the friend users, identity information of the to-be-selected friend users being used as the calibrated identity information of the training face image in the training sample, or identity information of friend users of the to-be-selected friend users being used as the calibrated identity information of the training face image in the training sample; and determine one of the to-be-selected friend users as the target friend user.

16. The apparatus according to claim 10, wherein the processing circuitry is further configured to generate a request result of an image clustering request based on the first face feature obtained by using the target face recognition model, the image clustering request being used for instructing to cluster images within a specified image range.

17. The apparatus according to claim 10, wherein the processing circuitry is further configured to generate a request result of an image search request based on the first face feature obtained by using the target face recognition model, the image search request being used for instructing to search for an image related to specified identity information within a specified image range.

18. A non-transitory computer-readable storage medium, the storage medium storing computer-readable instructions thereon, which, when executed by a processor, cause the processor to perform a method comprising:

generating a target face recognition model, the generating the target face recognition model includes determining a training sample, the training sample including a training face image calibrated with identity information, training a general face recognition model by using the training sample, updating a parameter of the general face recognition model based on a training target to obtain the target face recognition model, the training target being a prediction result of the general face recognition model predicting identity information of a new training face image in the training sample to be the calibrated identity information of the training face image in the training sample;

performing face detection on an image to obtain a first face image; and performing face recognition on the first face image in the image by using the target face recognition model to obtain a first face feature, wherein the updating the parameter of the general face recognition model based on the training target comprises:

performing face recognition on the new training face image by using the general face recognition model to obtain a face feature of the new training face image;

calculating a mapping distance between the obtained face feature of the new training face image and a target face feature corresponding to the calibrated identity information of the training face image in the training sample; and updating the parameter of the general face recognition model by minimizing the mapping distance, to obtain the target face recognition model.

\* \* \* \* \*